United States Patent
Mead et al.

(10) Patent No.: US 8,234,553 B2
(45) Date of Patent: *Jul. 31, 2012

(54) PERFORMING MULTIPLE REED-SOLOMON (RS) SOFTWARE ERROR CORRECTION CODING (ECC) GALOIS FIELD COMPUTATIONS SIMULTANEOUSLY

(75) Inventors: John P. Mead, Longmont, CO (US); Kevin W. McGinnis, Berthoud, CO (US)

(73) Assignee: Broadcom Corporation, Irvine, CA (US)

( * ) Notice: Subject to any disclaimer, the term of this patent is extended or adjusted under 35 U.S.C. 154(b) by 406 days.

This patent is subject to a terminal disclaimer.

(21) Appl. No.: 12/570,179

(22) Filed: Sep. 30, 2009

(65) Prior Publication Data

US 2010/0017688 A1    Jan. 21, 2010

Related U.S. Application Data

(63) Continuation of application No. 11/412,390, filed on Apr. 27, 2006, now Pat. No. 7,600,176.

(60) Provisional application No. 60/780,030, filed on Mar. 7, 2006.

(51) Int. Cl.
*H03M 13/00* (2006.01)

(52) U.S. Cl. ......... 714/784; 714/756; 714/757; 714/769

(58) Field of Classification Search .................. 714/756, 714/784, 769, 757
See application file for complete search history.

(56) References Cited

U.S. PATENT DOCUMENTS

| | | | | |
|---|---|---|---|---|
| 5,715,262 | A * | 2/1998 | Gupta .......................... | 714/784 |
| 5,912,905 | A * | 6/1999 | Sakai et al. .................... | 714/784 |
| 6,370,671 | B1 * | 4/2002 | Pan et al. ...................... | 714/784 |
| 7,600,176 | B2 * | 10/2009 | Mead et al. ................... | 714/784 |
| 2006/0212780 | A1 * | 9/2006 | Ohira et al. ................... | 714/776 |

* cited by examiner

*Primary Examiner* — Guy Lamarre
(74) *Attorney, Agent, or Firm* — Garlick & Markison; Shayne X. Short

(57) ABSTRACT

Performing multiple Reed-Solomon (RS) software error correction coding (ECC) Galois field computations simultaneously in a RISC processor. Galois field computations are performed in parallel with one another. Processor, memory, and plurality of adders and/or multipliers are implemented appropriately to allow parallel Galois field computations to be performed. Multiplexing can be performed to govern the writing of resultants (generated using the adders and/or multipliers) back to the memory via feedback paths. This approach allows for parallel (as opposed to serial) implementation of the software ECC corrections with minimal area and power impact. In other words, very little space is required to implement this approach is hardware with nominal increase in power consumption, and this slight increase in power consumption provides a significant increase in ECC correction capability using this approach.

20 Claims, 8 Drawing Sheets

US 8,234,553 B2

PERFORMING MULTIPLE REED-SOLOMON (RS) SOFTWARE ERROR CORRECTION CODING (ECC) GALOIS FIELD COMPUTATIONS SIMULTANEOUSLY

CROSS REFERENCE TO RELATED PATENTS/PATENT APPLICATIONS

Continuation Priority Claim, 35 U.S.C. §120

The present U.S. Utility Patent Application claims priority pursuant to 35 U.S.C. §120, as a continuation, to the following U.S. Utility Patent Application which is hereby incorporated herein by reference in its entirety and made part of the present U.S. Utility Patent Application for all purposes:

1. U.S. application Ser. No. 11/412,390, entitled "Performing multiple Reed-Solomon (RS) software error correction coding (ECC) Galois field computations simultaneously," filed Apr. 27, 2006, and scheduled to be issued as U.S. Pat. No. 7,600,176 on Oct. 6, 2009, which claims priority pursuant to 35 U.S.C. §119(e) to the following U.S. Provisional Patent Application which is hereby incorporated herein by reference in its entirety and made part of the present U.S. Utility Patent Application for all purposes:

a. U.S. Provisional Application Ser. No. 60/780,030, entitled "Performing multiple Reed-Solomon (RS) software error correction coding (ECC) Galois field computations simultaneously," filed Mar. 7, 2006.

BACKGROUND OF THE INVENTION

1. Technical Field of the Invention

The invention relates generally to memory storage devices; and, more particularly, it relates to error correction coding implemented within such memory storage devices.

2. Description of Related Art

As is known, many varieties of memory storage devices (e.g. disk drives), such as magnetic disk drives are used to provide data storage for a host device, either directly, or through a network such as a storage area network (SAN) or network attached storage (NAS). Typical host devices include stand alone computer systems such as a desktop or laptop computer, enterprise storage devices such as servers, storage arrays such as a redundant array of independent disks (RAID) arrays, storage routers, storage switches and storage directors, and other consumer devices such as video game systems and digital video recorders. These devices provide high storage capacity in a cost effective manner.

Within such hard disk drives (HDDs), error correction coding (ECC) is sometimes employed to ensure the ability to correct for errors of data that is written to and read from the storage media of a HDD. The ECC allows the ability to correct for those errors within the error correction capability of the code.

When performing decoding processing according to certain software based ECC approaches, the operations are oftentimes performed serially. For example, one computation is performed at a time and many processor operations are required per computation. For example, multiple processor operations can be required to perform a single computation within the decoding processing. The amount of time (and power) required to perform software based ECC corrections is extreme. Most prior art approaches perform all ECC correction in hardware because of the high cost of software based ECC correction. However, as the size of HDDs continues to grow, the associated cost to perform hardware based ECC correction will continue to grow.

In the HDD technology space, the amount of time (and power) required to perform software based ECC corrections is sometimes so large that many disk drive systems revert to retries as an earlier step in error recovery rather than perform the costly software ECC correction. Because of this, many designs simply will not implement software based ECC correction.

When such ECC correction processes are time and/or power consumptive, this competes can compete directly the performance of such a device. This can result is significant degradation in performance of a device given the high power consumption and/or the relatively slow response time (because of the many operations required to be performed when doing ECC correction). This high energy consumption of the ECC correction comes at the expense of the requisite energy required for other modules and/or processes within the device. Within battery powered devices (e.g., laptop computers when operating on battery power, hand-held devices, etc.) this can be extremely deleterious in terms of performance.

There exists a need in the art for a better, more efficient means of performing many of the various calculations that are performed during error correction decoding within such devices.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
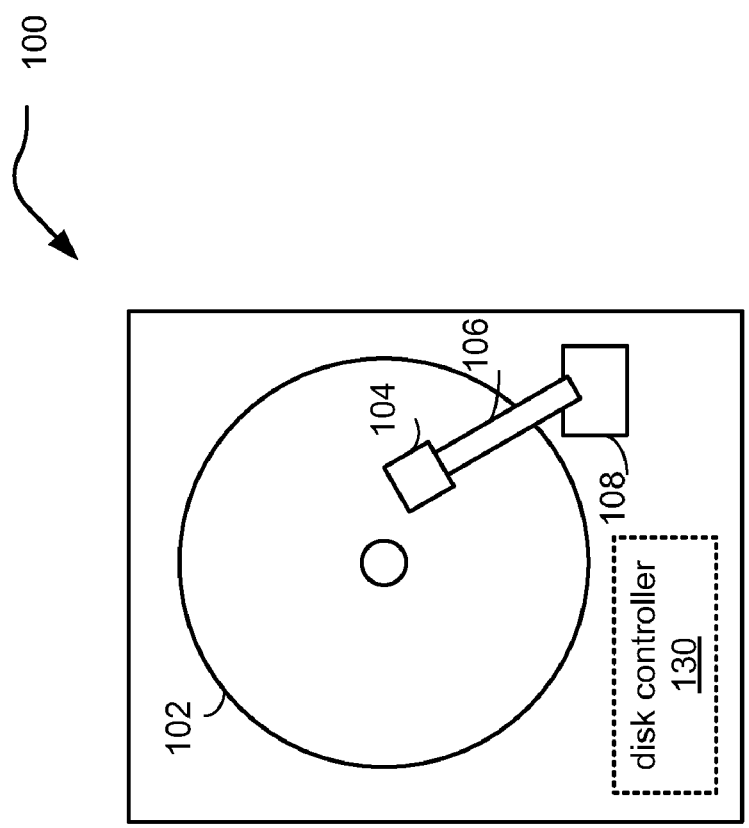
FIG. 1 illustrates an embodiment of a disk drive unit.

FIG. 1 illustrates an embodiment of a disk drive unit 100. In particular, disk drive unit 100 includes a disk 102 that is rotated by a servo motor (not specifically shown) at a velocity such as 3600 revolutions per minute (RPM), 4200 RPM, 4800 RPM, 5,400 RPM, 7,200 RPM, 10,000 RPM, 15,000 RPM, however, other velocities including greater or lesser velocities may likewise be used, depending on the particular application and implementation in a host device. In one possible embodiment, disk 102 can be a magnetic disk that stores information as magnetic field changes on some type of magnetic medium. The medium can be a rigid or non-rigid, removable or non-removable, that consists of or is coated with magnetic material.

Disk drive unit 100 further includes one or more read/write heads 104 that are coupled to arm 106 that is moved by actuator 108 over the surface of the disk 102 either by translation, rotation or both. A disk controller 130 is included for controlling the read and write operations to and from the drive, for controlling the speed of the servo motor and the motion of actuator 108, and for providing an interface to and from the host device.

Figure 2:
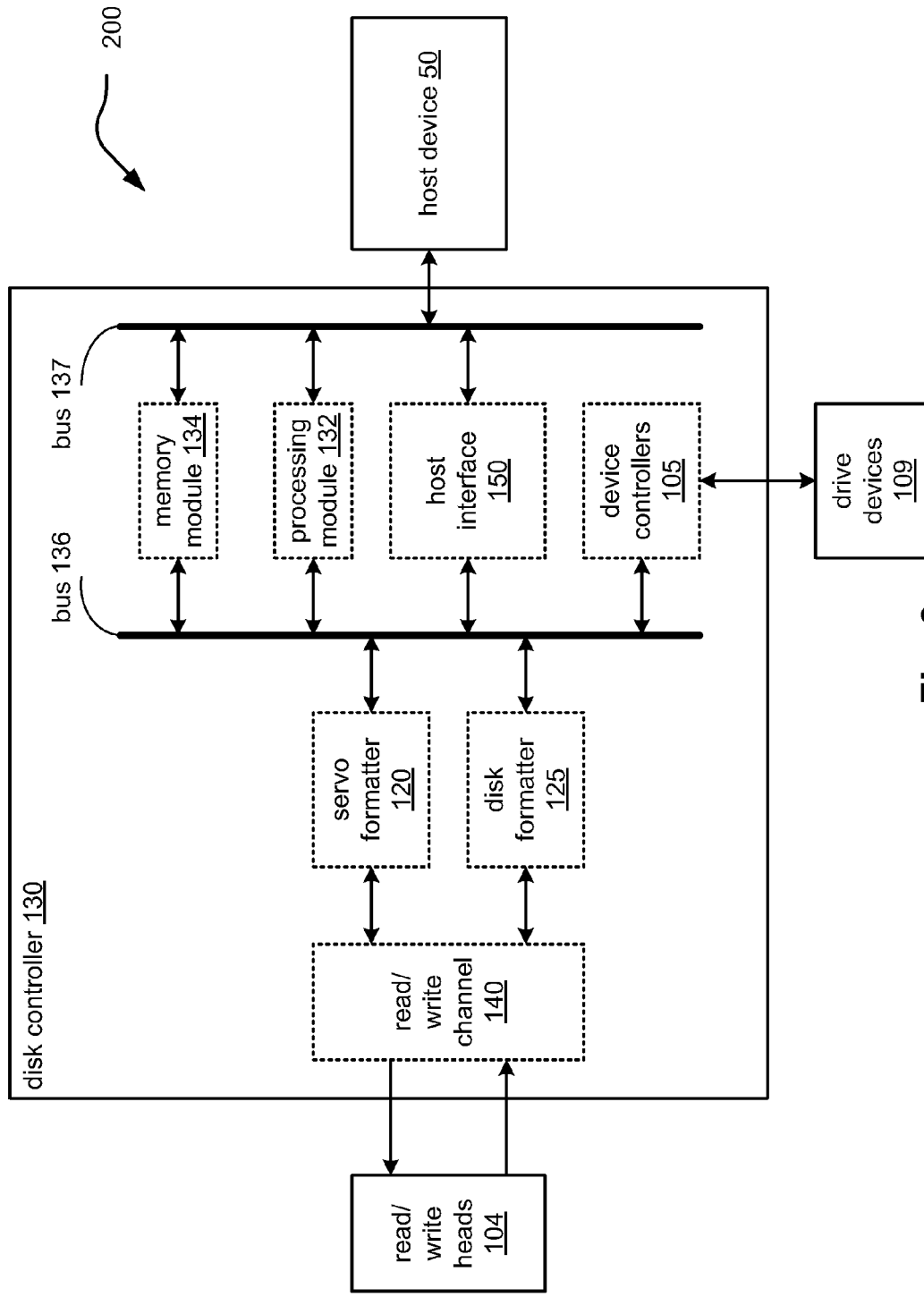
FIG. 2 illustrates an embodiment of an apparatus that includes a disk controller.

FIG. 2 illustrates an embodiment of an apparatus 200 that includes a disk controller 130. In particular, disk controller 130 includes a read/write channel 140 for reading and writing data to and from disk 102 through read/write heads 104. Disk formatter 125 is included for controlling the formatting of data and provides clock signals and other timing signals that control the flow of the data written to, and data read from disk 102. Servo formatter 120 provides clock signals and other timing signals based on servo control data read from disk 102. Device controllers 105 control the operation of drive devices 109 such as actuator 108 and the servo motor, etc. Host interface 150 receives read and write commands from host device 50 and transmits data read from disk 102 along with other control information in accordance with a host interface protocol. In one embodiment, the host interface protocol can include, SCSI, SATA, enhanced integrated drive electronics (EIDE), or any number of other host interface protocols, either open or proprietary that can be used for this purpose.

Disk controller 130 further includes a processing module 132 and memory module 134. Processing module 132 can be implemented using one or more microprocessors, micro-controllers, digital signal processors, microcomputers, central processing units, field programmable gate arrays, programmable logic devices, state machines, logic circuits, analog circuits, digital circuits, and/or any devices that manipulates signal (analog and/or digital) based on operational instructions that are stored in memory module 134. When processing module 132 is implemented with two or more devices, each device can perform the same steps, processes or functions in order to provide fault tolerance or redundancy. Alternatively, the function, steps and processes performed by processing module 132 can be split between different devices to provide greater computational speed and/or efficiency.

Memory module 134 may be a single memory device or a plurality of memory devices. Such a memory device may be a read-only memory, random access memory, volatile memory, non-volatile memory, static random access memory (SRAM), dynamic random access memory (DRAM), flash memory, cache memory, and/or any device that stores digital information. Note that when the processing module 132 implements one or more of its functions via a state machine, analog circuitry, digital circuitry, and/or logic circuitry, the memory module 134 storing the corresponding operational instructions may be embedded within, or external to, the circuitry comprising the state machine, analog circuitry, digital circuitry, and/or logic circuitry. Further note that, the memory module 134 stores, and the processing module 132 executes, operational instructions that can correspond to one or more of the steps or a process, method and/or function illustrated herein.

Disk controller 130 includes a plurality of modules, in particular, device controllers 105, processing module 132, memory module 134, read/write channel 140, disk formatter 125, servo formatter 120 and host interface 150 that are interconnected via bus 136 and bus 137. Each of these modules can be implemented in hardware, firmware, software or a combination thereof, in accordance with the broad scope of the present invention. While a particular bus architecture is shown in FIG. 2 with buses 136 and 137, alternative bus architectures that include either a single bus configuration or additional data buses, further connectivity, such as direct connectivity between the various modules, are likewise possible to implement the features and functions included in various embodiments.

In one possible embodiment, one or more modules of disk controller 130 are implemented as part of a system on a chip (SoC) integrated circuit. In an embodiment, this SoC integrated circuit includes a digital portion that can include additional modules such as protocol converters, linear block code encoding and decoding modules, etc., and an analog portion that includes device controllers 105 and optionally additional modules, such as a power supply, etc. In a further embodiment, the various functions and features of disk controller 130 are implemented in a plurality of integrated circuit devices that communicate and combine to perform the functionality of disk controller 130.

When the drive unit 100 is manufactured, disk formatter 125 writes a plurality of servo wedges along with a corresponding plurality of servo address marks at equal radial distance along the disk 102. The servo address marks are used by the timing generator for triggering the "start time" for various events employed when accessing the media of the disk 102 through read/write heads 104.

Figure 3:
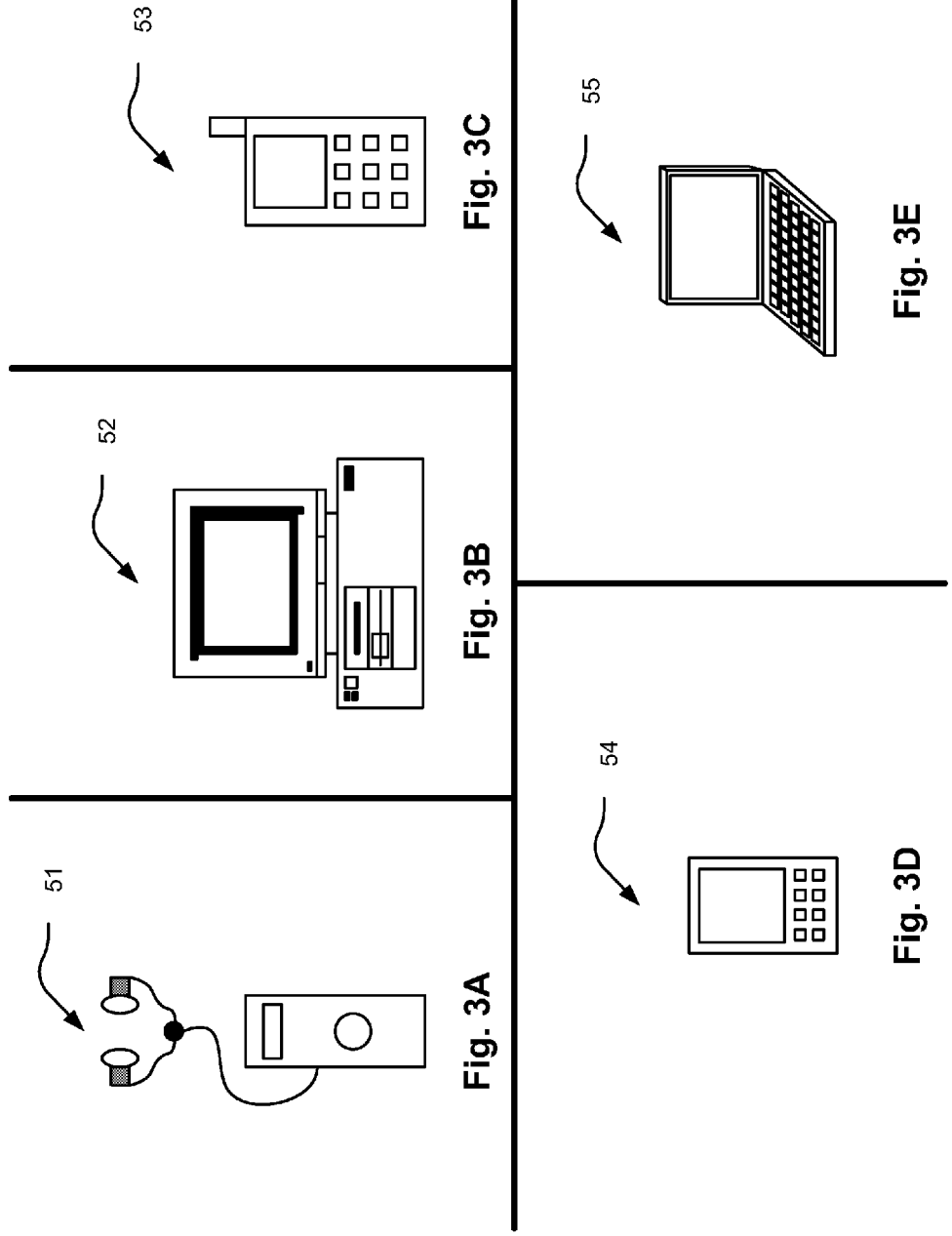
FIG. 3A illustrates an embodiment of a handheld audio unit.
FIG. 3B illustrates an embodiment of a computer.
FIG. 3C illustrates an embodiment of a wireless communication device.
FIG. 3D illustrates an embodiment of a personal digital assistant (PDA).
FIG. 3E illustrates an embodiment of a laptop computer.

FIG. 3A illustrates an embodiment of a handheld audio unit 51. In particular, disk drive unit 100 can be implemented in the handheld audio unit 51. In one possible embodiment, the disk drive unit 100 can include a small form factor magnetic hard disk whose disk 102 has a diameter 1.8" or smaller that is incorporated into or otherwise used by handheld audio unit 51 to provide general storage or storage of audio content such as motion picture expert group (MPEG) audio layer 3 (MP3) files or Windows Media Architecture (WMA) files, video content such as MPEG4 files for playback to a user, and/or any other type of information that may be stored in a digital format.

FIG. 3B illustrates an embodiment of a computer 52. In particular, disk drive unit 100 can be implemented in the computer 52. In one possible embodiment, disk drive unit 100 can include a small form factor magnetic hard disk whose disk 102 has a diameter 1.8" or smaller, a 2.5" or 3.5" drive or larger drive for applications such as enterprise storage applications. Disk drive 100 is incorporated into or otherwise used by computer 52 to provide general purpose storage for any type of information in digital format. Computer 52 can be a desktop computer, or an enterprise storage devices such a server, of a host computer that is attached to a storage array such as a redundant array of independent disks (RAID) array, storage router, edge router, storage switch and/or storage director.

FIG. 3C illustrates an embodiment of a wireless communication device 53. In particular, disk drive unit 100 can be implemented in the wireless communication device 53. In one possible embodiment, disk drive unit 100 can include a small form factor magnetic hard disk whose disk 102 has a diameter 1.8" or smaller that is incorporated into or otherwise used by wireless communication device 53 to provide general storage or storage of audio content such as motion picture expert group (MPEG) audio layer 3 (MP3) files or Windows Media Architecture (WMA) files, video content such as MPEG4 files, JPEG (joint photographic expert group) files, bitmap files and files stored in other graphics formats that may be captured by an integrated camera or downloaded to the wireless communication device 53, emails, webpage information and other information downloaded from the Internet, address book information, and/or any other type of information that may be stored in a digital format.

In a possible embodiment, wireless communication device 53 is capable of communicating via a wireless telephone network such as a cellular, personal communications service (PCS), general packet radio service (GPRS), global system for mobile communications (GSM), and integrated digital enhanced network (iDEN) or other wireless communications network capable of sending and receiving telephone calls. Further, wireless communication device 53 is capable of communicating via the Internet to access email, download content, access websites, and provide steaming audio and/or video programming. In this fashion, wireless communication device 53 can place and receive telephone calls, text messages such as emails, short message service (SMS) messages, pages and other data messages that can include attachments such as documents, audio files, video files, images and other graphics.

FIG. 3D illustrates an embodiment of a personal digital assistant (PDA) 54. In particular, disk drive unit 100 can be implemented in the personal digital assistant (PDA) 54. In one possible embodiment, disk drive unit 100 can include a small form factor magnetic hard disk whose disk 102 has a diameter 1.8" or smaller that is incorporated into or otherwise used by personal digital assistant 54 to provide general storage or storage of audio content such as motion picture expert group (MPEG) audio layer 3 (MP3) files or Windows Media Architecture (WMA) files, video content such as MPEG4 files, JPEG (joint photographic expert group) files, bitmap files and files stored in other graphics formats, emails, webpage information and other information downloaded from the Internet, address book information, and/or any other type of information that may be stored in a digital format.

FIG. 3E illustrates an embodiment of a laptop computer 55. In particular, disk drive unit 100 can be implemented in the laptop computer 55. In one possible embodiment, disk drive unit 100 can include a small form factor magnetic hard disk whose disk 102 has a diameter 1.8" or smaller, or a 2.5" drive. Disk drive 100 is incorporated into or otherwise used by laptop computer 52 to provide general purpose storage for any type of information in digital format.

Figure 4:
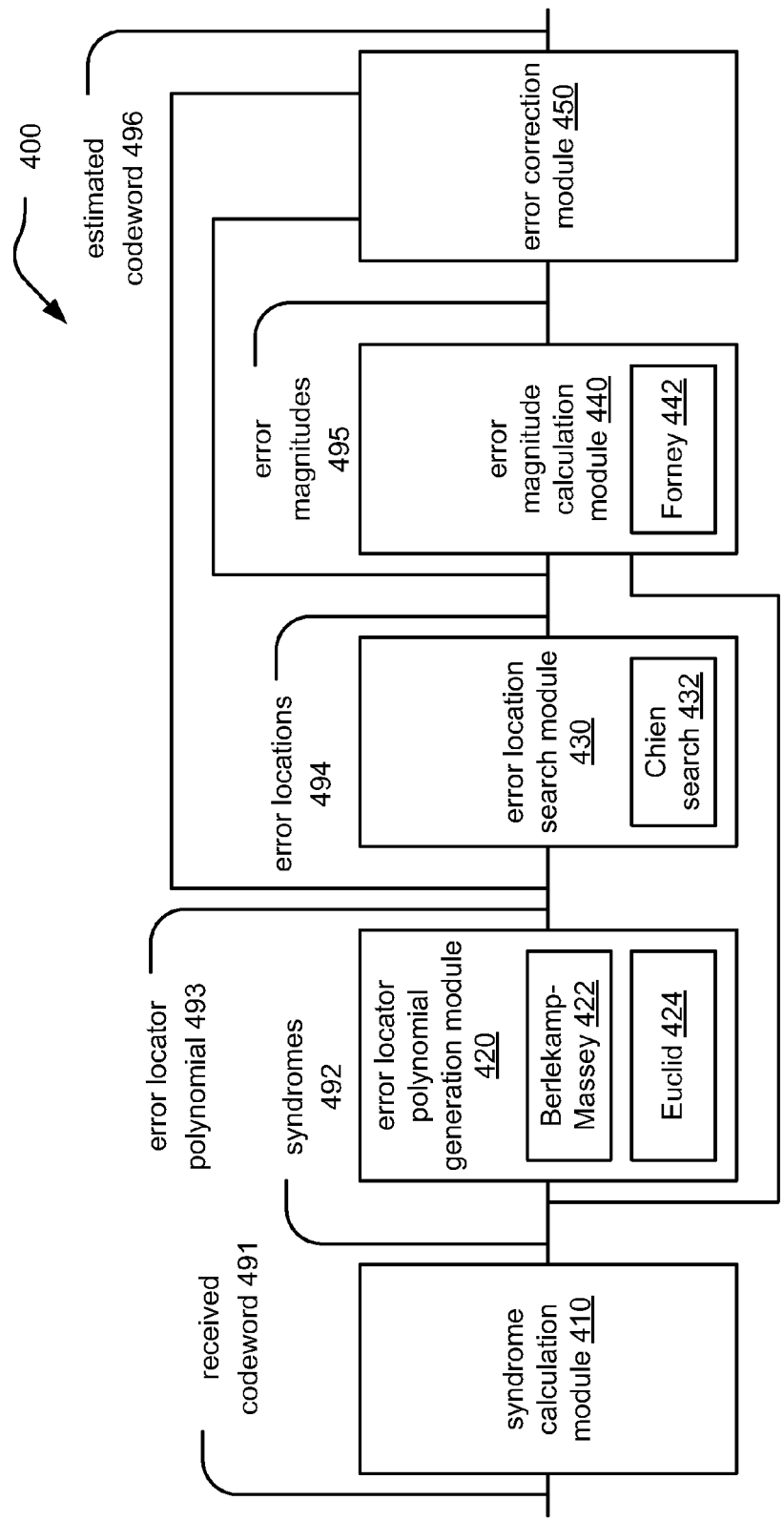
FIG. 4 illustrates an embodiment of at least a portion of an apparatus that is operable to perform Reed-Solomon (RS) decoding.

FIG. 4 illustrates an embodiment of at least a portion of an apparatus that is operable to perform Reed-Solomon (RS) decoding. This apparatus can be viewed as including a RS decoder 400. This is a general depiction of an architecture of a RS decoder 400, and it is noted that variations and/or modifications thereof may be performed without departing from the scope and spirit of the invention.

A corresponding RS encoder (not shown) takes data (e.g., a block of digital data) and adds redundancy or parity bits thereto thereby generating a codeword (e.g., a codeword to be written or transmitted). This redundancy is generated as a function of the particular RS code employed. Therefore, when the data (after undergoing RS encoding) is provided to storage media, and after it is read there from, in the undesirable event that any errors occurred during either of these processes (write and/or read), hopefully the number of errors incurred is less than the error correcting capability of the RS code. The number and types of errors that can be corrected depends on the particular characteristics of the RS code employed. For example, some RS codes have greater error correction capability than other RS codes, and vice versa.

Looking at FIG. 4, a received codeword 491 can be viewed as being the originally transmitted (or written) codeword plus any errors that have been incurred during the write and/or read processes to (and/or from) the media. In addition, perhaps some defects occurred to the actual physical surface of the storage media after the codeword has been written. This received codeword would then also include those incurred errors as well. Generally speaking, the RS decoder 400 attempts to identify the locations and magnitudes of any errors within the received codeword 491 (up to the error correcting capability of the RS code) and to correct those errors.

A syndrome calculation module 410 then processes the received codeword 491 to generate syndromes 492. The operation of the syndrome calculation module 410 is analogous and similar to the calculation of the redundancy or parity bits within the RS encoding processing. As a function of the RS code employed, a RS codeword has a predetermined number of syndromes that depend only on errors (i.e., not on the actually written or transmitted codeword). The syndromes can be calculated by substituting a predetermined number of roots (as determined by the RS code) of the generator polynomial (employed within RS encoding) into the received codeword 491.

An error locator polynomial generation module 420 then receives these calculated syndromes 492. The syndromes 492 are also passed to an error magnitude calculation module 440 (more detail of which is provided below). The error locator polynomial generation module 420 can generate the error locator polynomial 493 using various means, two of which can include the Berlekamp-Massey method 422 or the Euclid method 424, as known in the art.

The error locator polynomial 493 is provided to an error correction module 450. The error locator polynomial 493 is also provided to an error location search module 430 that is operable to solve for the roots of the error locator polynomial 493. One approach is to employ the Chien search function 432. The Chien search function 432 operates by performing at least a plurality of constant multiplication functions. This plurality of constant multiplication functions, as performed within the Chien search function 432, can be viewed as being one area in which Galois field computations are performed.

Once the error locations 494 have been found within the error location search module 430 (i.e., using the Chien search function 432), then the error locations 494 are provided to the error magnitude calculation module 440 as well as to the error correction module 450. The error magnitude calculation module 440 finds the symbol error values, and it can employ a known approach such as the Forney method 442. Once the error locations 494 and the error magnitudes 495 are known, then the error correction module 450 corrects for them and outputs an estimated codeword 496.

Looking at this embodiment, many of the modules and/or functions within the RS decoder 400 operate by performing various Galois field computations. Some examples of these Galois field computations include Galois field multiplication and Galois field addition.

Many of the computations performed within RS decoding processing can be described in the context of a finite field (e.g., a Galois field). Consider a finite field (Galois field)

GF(q), where $q=p^m$ and p is a prime number and integer m>0. Let a be a primitive element of this field. Then, the Galois field may be defined as follows:

$$GF(q)=\{0,\alpha,\ldots,\alpha^{q-1}\}$$

In a digital implementation of an apparatus operating using finite precision math (i.e., that uses a certain number of bits to represent numbers), then certain calculations are performed digitally using values that are also represented by groups of bits that correspond to these numbers that are undergoing the Galois field computations (e.g., these groups of bits can be referred to as symbols).

Generally speaking, many RS ECC systems are based on elements called symbols. When considering HDD and other similar disk drive applications, the ECC symbols employed therein can range in size from 8-bits up to 12-bits (e.g., generally x bits, where x is an integer), depending on the requirements of the system. Correcting ECC errors can be accomplished in hardware, software or a combination of both.

Performing RS ECC corrections in software requires many Galois field computations to be performed on symbol elements. A vast majority of these computations can be reduced to two types: (1) Galois field multiplication (A*B=C) and (2) Galois field addition (A XOR B=C).

Due to the nature of the RS ECC decoding approach, it is feasible to perform multiple computations simultaneously in many cases. Software ECC correction can be taken to one extreme of using a vector processor to perform the maximum number of parallel computations in a single clock cycle or the other extreme of performing ECC computations in serial and each in many steps.

A novel means is presented herein to balance the cost and overall ECC computation time for an optimized system that is operable to perform RS decoding processing. Generally speaking, multiple Galois field computations can be performed simultaneously within individual clock cycles using various aspects of the invention.

Figure 5:
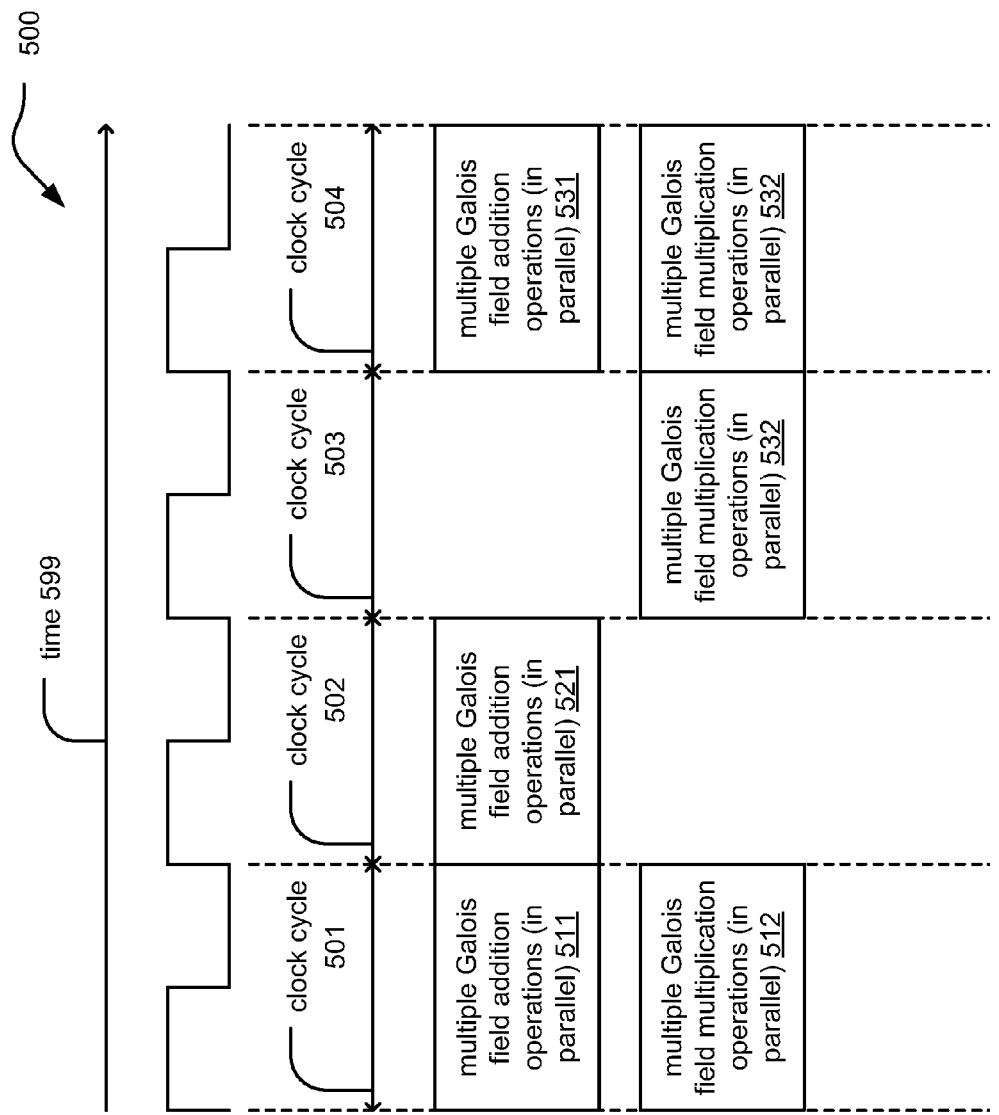
FIG. 5 illustrates an embodiment of multiple Galois field operations being performed within individual clock cycles.

FIG. 5 illustrates an embodiment of multiple Galois field operations being performed within individual clock cycles. As mentioned above, many of the processes and operations performed within RS decoding processing employ various Galois field computations. These Galois field computations can be Galois field multiplication operations and/or Galois field addition operations.

Multiple of these Galois field computations can be performed within a single clock cycle. As shown as a function of time 599, during each of a plurality of clock cycles (shown as clock cycles 501, 502, 503, 504, and so on), one or more Galois field computations is/are performed. For example, during clock cycle 501, multiple Galois field addition operations are performed in parallel as shown by reference numeral 511. Also, clock cycle 501, multiple Galois field multiplication operations are performed in parallel as shown by reference numeral 512.

During clock cycle 502, multiple Galois field addition operations are performed in parallel as shown by reference numeral 521. During clock cycle 503, multiple Galois field multiplication operations are performed in parallel as shown by reference numeral 532.

During clock cycle 504, multiple Galois field addition operations are performed in parallel as shown by reference numeral 531. Also, clock cycle 504, multiple Galois field multiplication operations are performed in parallel as shown by reference numeral 532.

As can be seen, multiple Galois field multiplication operations and/or multiple Galois field addition operations can be performed during any one clock cycle. In some instances, the resultants generated during a first clock cycle for one group of Galois field computations are provided and processed during a second clock cycle for another group of Galois field computations. Giving one example with reference to the diagram, resultants generated during clock cycle 501 by multiple Galois field addition operations 511 can be employed as the inputs that are processed during clock cycle 502 by multiple Galois field addition operations 521. In other words, the resultants generated by multiple Galois field addition operations 511 during clock cycle 501 serve as the inputs for the multiple Galois field addition operations 521 during the clock cycle 502.

In this example, it can be seen that to perform a two step addition/multiplication process requires two clock cycles. If only one of the addition or multiplication is required, then a single clock cycle is sufficient.

Figure 6:
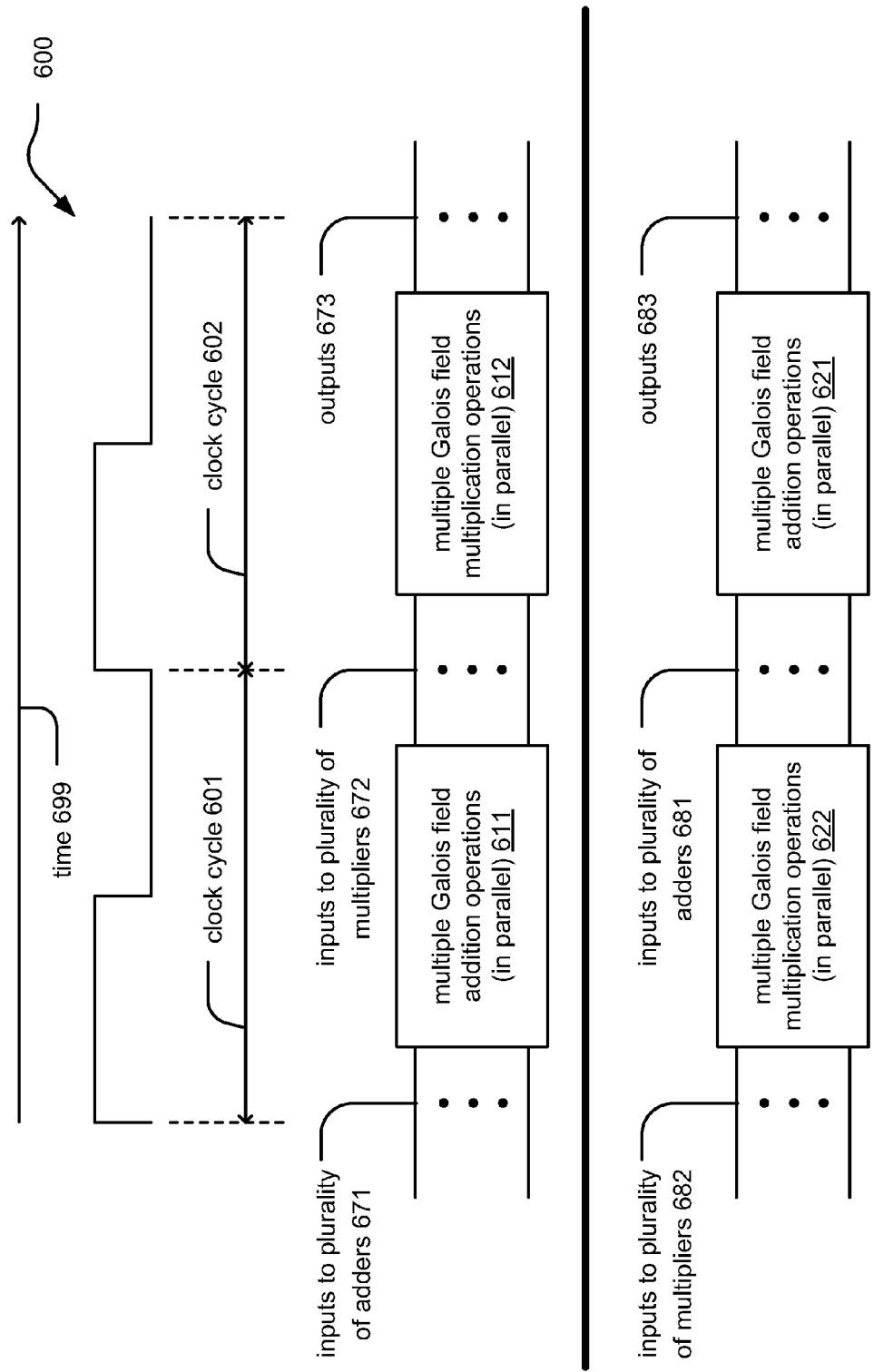
FIG. 6 illustrates an alternative embodiment of multiple Galois field operations being performed within individual clock cycles.

FIG. 6 illustrates an alternative embodiment 600 of multiple Galois field operations being performed within individual clock cycles. This embodiment 600 depicts more specifically how the resultants generated during a first clock cycle can be employed for use during a second clock cycle.

As described within some other embodiments, multiple Galois field computations can be performed within a single clock cycle. As shown as a function of time 699, during each of a plurality of clock cycles (shown as clock cycles 601, 602, and so on), one or more Galois field computations is/are performed. For example, during clock cycle 601, inputs are provided to a plurality of adders as shown by reference numeral 671. Multiple Galois field addition operations are performed in parallel as shown by reference numeral 611. At the end of clock cycle 601, these particular resultants generated during clock cycle 601 are then provided as inputs to a plurality of multipliers as shown by reference numeral 672. Multiple Galois field multiplication operations are performed in parallel as shown by reference numeral 612. The outputs 673 are thereby the resultants of both addition and multiplication operations. In some instances within RS decoding processing, both addition and multiplication Galois filed operations are required, and this shows how this can be achieved during two clock cycles.

Alternatively, inputs can be provided to a plurality of multipliers as shown by reference numeral 682. Multiple Galois field multiplication operations are performed in parallel as shown by reference numeral 622. At the end of clock cycle 601, these particular resultants generated during clock cycle 601 are then provided as inputs to a plurality of adders as shown by reference numeral 681. Multiple Galois field addition operations are performed in parallel as shown by reference numeral 621. The outputs 683 are thereby the resultants of both multiplication and addition operations. Again, in some instances within RS decoding processing, both multiplication and addition Galois filed operations are required, and this shows how this can be achieved during two clock cycles.

From certain perspectives within some embodiments, the combination operations of the blocks 611 and 612 is equivalent to the operations of the blocks 622 and 621. If this is the case in a particular embodiment, the outputs 673 and the outputs 683 are the same. This embodiment depicts how a designer is provided discretion and choice with respect to the order by which the addition and multiplication operations are performed.

Figure 7:
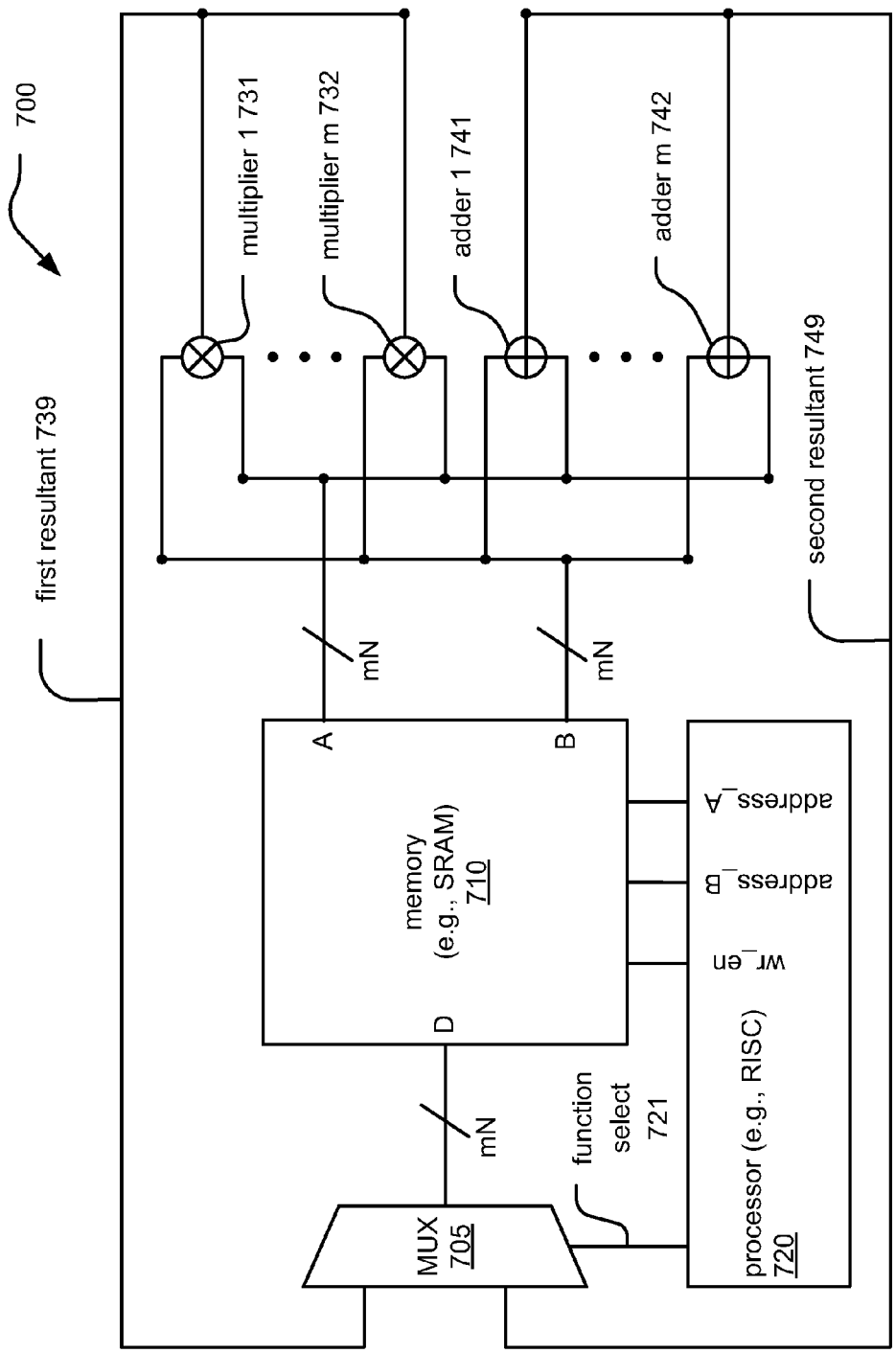
FIG. 7 illustrates an embodiment of an apparatus that is operable to perform multiple Galois field operations within individual clock cycles.

FIG. 7 illustrates an embodiment of an apparatus 700 that is operable to perform multiple Galois field operations within individual clock cycles. In some instances, the apparatus 700 can be viewed as being at least part of a decoder that is operable to perform multiple Galois field computations (additions and/or multiplications) during individual clock cycles.

In this apparatus 700, a processor 720 is accompanied by some additional functionality to support multiple Galois field computations to be performed within individual clock cycles. The processor 720 can be a reduced instruction set computer (RISC) processor in some embodiments. Generally, the processor 720 can be a digital signal processor (DSP) having a desired degree of complexity and capability as selected for a given application.

A memory 710 is coupled to the processor 720, and the memory 710 receives at least three signals: a write enable signal corresponding to its write port (D), a first address corresponding to one of its read ports (A, using signal address_A), and a second address corresponding to the other of its read ports (B, using signal address_B).

The memory 710 can be viewed as being a (multiple-symbol) wide memory interface having dual-read-ports (e.g., depicted by A and B) and a single write port (e.g., depicted by D). Such a memory 720 can be implemented using static random access memory (SRAM) and/or any other type of memory as may be desired within a particular embodiment.

The pair of read ports (e.g., depicted by A and B) feed operand-controlled parallel Galois field multipliers and adders (XOR) that generate a first resultant 739 and a second resultant 749, respectively, which are fed back to the write port (e.g., depicted by D) of the memory 710. The parallel Galois field multipliers are depicted by multiplier 1 731, . . . , and multiplier m 732. There can be as few as 1 or 2 multipliers within the parallel Galois field multipliers in some embodiments.

The parallel Galois field adders (XOR) are depicted by adder 1 741, . . . , and adder m 742. There can be as few as 1 or 2 adders within the parallel Galois field adders in some embodiments.

As described above, when considering HDD and other similar disk drive applications, the ECC symbols employed therein can range in size from 8-bits up to 12-bits (e.g., generally x bits, where x is an integer), depending on the requirements of the system. In this diagram, m calculations are performed at a time on symbols that are N bits wide.

A multiplexor (MUX) 705 can be interposed within this feedback path to control the writing of the first resultant 739 or the second resultant 749 to the memory 710 via its write port. A function select signal 721 is provided from the processor 720 to the MUX 705 that operates to direct the apparatus 700 to perform addition or multiplication.

Under firmware control, multiple Galois field computations can be performed in a single clock cycle. With this architecture software ECC corrections can be accomplished with extreme performance improvement over an all-serial processor approach. In addition, minimal area and power impact can be achieved using this architecture.

By using such an apparatus 700 within decoding processing that employs ECC correction capability, the hardware required to be used to perform many of the Galois field calculations can be reduced significantly when compared to prior art approaches, in that, the ECC correction, as performed using software ECC correction, can essentially be performed as a background task for sectors of the storage media in which more errors exist than the provisioned hardware is capable to correct. For example, when more errors occur than the provisioned hardware is capable to correct, then the software ECC correction can take over processing this portion as a background task thereby allowing significantly parallel processing capability.

Since the situation of more errors occurring than the provisioned hardware is capable to correct would not occur very often, the corrections could be performed in the background over a small number of sector times and the software ECC can then perform corrections in the main buffer and be released when the ECC corrections are complete. In such a system, the performance would be only minimally impacted by performing ECC correction in this manner since the data transfer would continue as normal even during this ECC correction processing (which is essentially performed as a background task).

Figure 8:
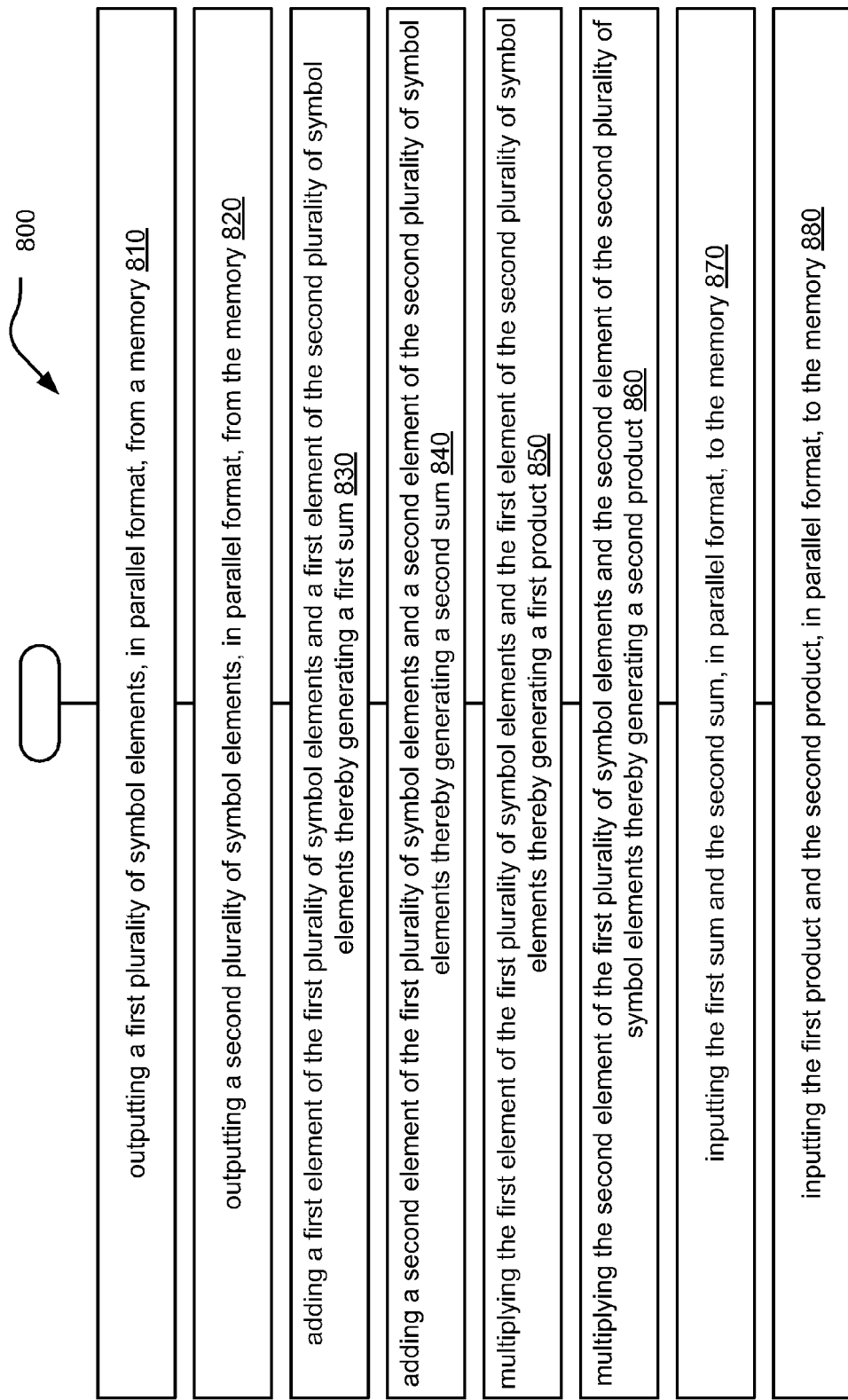
FIG. 8 illustrates an embodiment of a method that is operable to perform multiple Galois field operations within individual clock cycles.

FIG. 8 illustrates an embodiment of a method 800 that is operable to perform multiple Galois field operations within individual clock cycles. The method 800 operates by outputting a first plurality of symbol elements, in parallel format, from a memory as shown in a block 810. The method 800 then operates by outputting a second plurality of symbol elements, in parallel format, from the memory as shown in a block 820.

As shown in a block 830, the method 800 continues by adding a first element of the first plurality of symbol elements and a first element of the second plurality of symbol elements thereby generating a first sum. The method 800 also involves adding a second element of the first plurality of symbol elements and a second element of the second plurality of symbol elements thereby generating a second sum as shown in a block 840.

The method 800 also involves multiplying the first element of the first plurality of symbol elements and the first element of the second plurality of symbol elements thereby generating a first product as shown in a block 850. The method 800 also involves multiplying the second element of the first plurality of symbol elements and the second element of the second plurality of symbol elements thereby generating a second product as shown in a block 860.

The method 800 then involves inputting the first sum and the second sum, in parallel format, to the memory as shown in a block 870, and the method 800 involves inputting the first product and the second product, in parallel format, to the memory as shown in a block 880.

In some embodiments, the operations of the blocks 810 and 820 can be performed within a first time, the operations of the blocks 830, 840, 850, and 860 can be performed within a second time, and the operations of the blocks 870 and 880 can be performed within a third time.

While many of the embodiments described above illustrate operation as a function of at least a first clock cycle and a second clock cycle, it is noted that the various embodiments may alternatively be implemented to perform according to at least a first time and a second time as well without departing from the scope and spirit of the invention. For example, each of a first time and a second time could be more than or less than a singular clock cycle if desired.

In view of the above detailed description of the invention and associated drawings, other modifications and variations will now become apparent. It should also be apparent that such other modifications and variations may be effected without departing from the spirit and scope of the invention.

What is claimed is:

1. An apparatus, comprising:
a Reed-Solomon (RS) decoder circuitry that is operative to process a RS coded signal to make an estimate of an information bit encoded therein; and wherein:
during a single clock cycle, the RS decoder circuitry is operative to:
perform a first plurality of Galois field computations using a first plurality of symbol elements of the RS coded signal and a second plurality of symbol elements of the RS coded signal thereby generating a first resultant; and perform a second plurality of Galois field computations using the first plurality of symbol elements of the RS coded signal and the second plurality of symbol elements of the RS coded signal thereby generating a second resultant; and the RS decoder circuitry is operative to employ the first resultant and the second resultant in accordance with making the estimate of the information bit encoded within the RS coded signal.

2. The apparatus of claim 1, wherein the RS decoder circuitry further comprising:

a memory; and a processor that is operative to control alternative writing of the first resultant and the second resultant to the memory; and wherein:

the RS decoder circuitry is operative to employ at least one of the first resultant and the second resultant within a third plurality of Galois field computations performed during at least one additional single clock cycle.

3. The apparatus of claim 2, wherein the RS decoder circuitry further comprising:

a multiplexor that is operable to:

receive the first resultant;

receive the second resultant; and provide the first resultant and the second resultant sequentially, based on a select signal, to the memory; and wherein:

the select signal is provided from the processor.

4. The apparatus of claim 2, wherein:

the memory includes one write port; and the memory includes two read ports.

5. The apparatus of claim 1, wherein:

each of the first plurality of symbol elements and the second plurality of symbol elements is arranged in parallel format; and the RS decoder circuitry is operative to perform one of the first plurality of Galois field computations using a first symbol element of the first plurality of symbol elements of the RS coded signal and a first symbol element of the second plurality of symbol elements of the RS coded signal; and the RS decoder circuitry is operative to perform one of the second plurality of Galois field computations using a second symbol element of the first plurality of symbol elements of the RS coded signal and a second symbol element of the second plurality of symbol elements of the RS coded signal.

6. The apparatus of claim 1, wherein the RS decoder circuitry further comprising:

a plurality of adders;

a plurality of multipliers; and wherein:

the RS decoder circuitry is operative to perform the first plurality of Galois field computations using the plurality of adders; and the RS decoder circuitry is operative to perform the second plurality of Galois field computations using the plurality of multipliers.

7. The apparatus of claim 6, wherein:

m and N are integers;

the plurality of adders includes m adders; and each of the first plurality of symbol elements of the RS coded signal and each of the second plurality of symbol elements includes m×N bits.

8. The apparatus of claim 6, wherein:

m and N are integers;

the plurality of multipliers includes m multipliers; and each of the first plurality of symbol elements of the RS coded signal and each of the second plurality of symbol elements includes m×N bits.

9. The apparatus of claim 1, wherein:

one of the first plurality of Galois field computations and the second plurality of Galois field computations is performed in accordance with Chien searching to search for a location of an error within the RS coded signal.

10. The apparatus of claim 1, wherein:

the RS coded signal is read from or written to a storage media of a hard disk drive (HDD).

11. The apparatus of claim 1, wherein:

the apparatus is a handheld audio unit, a computer, a wireless communication device, or a personal digital assistant, or a laptop computer.

12. An apparatus, comprising:

a Reed-Solomon (RS) decoder circuitry, that includes a memory and a processor, that is operative to process a RS coded signal to make an estimate of an information bit encoded therein; and wherein:

during a first single clock cycle, the RS decoder circuitry is operative to:

perform a plurality of Galois field multiplication computations using a first plurality of symbol elements of the RS coded signal and a second plurality of symbol elements of the RS coded signal thereby generating a first resultant; and perform a plurality of Galois field addition computations using the first plurality of symbol elements of the RS coded signal and the second plurality of symbol elements of the RS coded signal thereby generating a second resultant; and the processor is operative to control alternative writing of the first resultant and the second resultant to the memory;

during a second single clock cycle, the RS decoder circuitry is operative to employ at least one of the first resultant and the second resultant, provided from the memory, within at least one additional plurality of Galois field computations thereby generating a third resultant; and the RS decoder circuitry is operative to employ at least one of the first resultant, the second resultant, and the third resultant in accordance with making the estimate of the information bit encoded within the RS coded signal.

13. The apparatus of claim 12, wherein the RS decoder circuitry further comprising:

a multiplexor that is operable to:

receive the first resultant;

receive the second resultant; and provide the first resultant and the second resultant sequentially, based on a select signal, to the memory; and wherein:

the select signal is provided from the processor.

14. The apparatus of claim 12, wherein:

the memory includes one write port; and the memory includes two read ports.

15. The apparatus of claim 12, wherein the RS decoder circuitry further comprising:

a plurality of adders;

a plurality of multipliers; and wherein:

the RS decoder circuitry is operative to perform the first plurality of Galois field computations using the plurality of adders;

the RS decoder circuitry is operative to perform the second plurality of Galois field computations using the plurality of multipliers;

m and N are integers;

the plurality of adders includes m adders;

the plurality of multipliers includes m multipliers; and each of the first plurality of symbol elements of the RS coded signal and each of the second plurality of symbol elements includes m×N bits.

16. A method, comprising:

employing a Reed-Solomon (RS) decoder circuitry to process a RS coded signal to make an estimate of an information bit encoded therein; and wherein:

during a single clock cycle:

performing a first plurality of Galois field computations using a first plurality of symbol elements of the RS coded signal and a second plurality of symbol elements of the RS coded signal thereby generating a first resultant; and performing a second plurality of Galois field computations using the first plurality of symbol elements of the RS coded signal and the second plurality of symbol elements of the RS coded signal thereby generating a second resultant; and employing the first resultant and the second resultant in accordance with making the estimate of the information bit encoded within the RS coded signal.

17. The method of claim 16, wherein:

each of the first plurality of symbol elements and the second plurality of symbol elements is arranged in parallel format; and further comprising:

performing one of the first plurality of Galois field computations using a first symbol element of the first plurality of symbol elements of the RS coded signal and a first symbol element of the second plurality of symbol elements of the RS coded signal; and performing one of the second plurality of Galois field computations using a second symbol element of the first plurality of symbol elements of the RS coded signal and a second symbol element of the second plurality of symbol elements of the RS coded signal.

18. The method of claim 16, wherein:

one of the first plurality of Galois field computations and the second plurality of Galois field computations is performed in accordance with Chien searching to search for a location of an error within the RS coded signal.

19. The method of claim 16, wherein:

the RS coded signal is read from or written to a storage media of a hard disk drive (HDD).

20. The method of claim 16, wherein:

the apparatus is a handheld audio unit, a computer, a wireless communication device, or a personal digital assistant, or a laptop computer.

* * * * *